United States Patent
Perronnin et al.

(10) Patent No.: US 8,644,622 B2
(45) Date of Patent: Feb. 4, 2014

(54) COMPACT SIGNATURE FOR UNORDERED VECTOR SETS WITH APPLICATION TO IMAGE RETRIEVAL

(75) Inventors: Florent Perronnin, Domene (FR); Herve Poirier, Meylan (FR)

(73) Assignee: Xerox Corporation, Norwalk, CT (US)

( * ) Notice: Subject to any disclaimer, the term of this patent is extended or adjusted under 35 U.S.C. 154(b) by 933 days.

(21) Appl. No.: 12/512,209

(22) Filed: Jul. 30, 2009

(65) Prior Publication Data

US 2011/0026831 A1 Feb. 3, 2011

(51) Int. Cl.
*G06K 9/68* (2006.01)
*G06K 9/64* (2006.01)
*G06F 17/15* (2006.01)
*G06F 17/16* (2006.01)

(52) U.S. Cl.
USPC ........... 382/218; 382/181; 382/197; 382/221; 382/222; 382/224; 382/278; 382/305; 708/422; 708/423; 708/424

(58) Field of Classification Search
USPC ......... 382/218, 181, 197, 221, 224, 228, 278, 382/305; 708/422, 423, 424
See application file for complete search history.

(56) References Cited

U.S. PATENT DOCUMENTS

| | | | | |
|---|---|---|---|---|
| 4,319,221 A | * | 3/1982 | Sakoe | 382/215 |
| 5,774,588 A | * | 6/1998 | Li | 382/230 |
| 5,819,288 A | * | 10/1998 | De Bonet | 1/1 |
| 5,870,754 A | * | 2/1999 | Dimitrova et al. | 1/1 |
| 5,987,456 A | * | 11/1999 | Ravela et al. | 1/1 |
| 6,961,736 B1 | * | 11/2005 | Amirghodsi | 1/1 |
| 8,249,366 B2 | * | 8/2012 | Mei et al. | 382/224 |
| 2003/0147558 A1 | * | 8/2003 | Loui et al. | 382/225 |
| 2008/0310731 A1 | * | 12/2008 | Stojancic et al. | 382/195 |
| 2009/0144033 A1 | | 6/2009 | Liu et al. | |
| 2010/0205174 A1 | * | 8/2010 | Jiang et al. | 707/725 |

OTHER PUBLICATIONS

Chitkara, et al. Content-Based Image Retrieval Using Binary Signatures. Technical Report TR 00-18. University of Alberta, 2000.*
Rubner, et al. "The Earth Movers Distance as a Metric for Image Retrieval." International Journal of Computer Vision. 40.2 (2000): 99-121. Print.*
Wilson, et al. "Content Based Searching of Multimedia Databases Using Approximate Digital Signatures." Internet Multimedia Management Systems III, Proceedings of SPIE. 4862.2002 (2002): 175-186. Print.*

(Continued)

*Primary Examiner* — Michael A Newman
(74) *Attorney, Agent, or Firm* — Fay Sharpe LLP (57) ABSTRACT

To compute a signature for an object comprising or represented by a set of vectors in a vector space of dimensionality D, statistics are computed that are indicative of distribution of the vectors of the set of vectors amongst a set of regions $R_i$, i=1, . . . , N of the vector space, at least some statistics associated with each region are binarized to generate sets of binary values $a_i$, i=1, . . . , N indicative of statistics of the vectors of the set of vectors belonging to the respective regions $R_i$, i=1, . . . , N; and a vector set signature is defined for the set of vectors including the sets of binary values $a_i$, i= 1, . . . , N. The computing, binarizing, and defining operations may be repeated for two sets of vectors, and a quantitative comparison of the two sets of vectors determined based on the corresponding vector set signatures.

21 Claims, 4 Drawing Sheets

(56) References Cited

OTHER PUBLICATIONS

Chitkara et al. Content-Based Image Retrieval Using Binary Signatures. Technical Report TR 00-18. University of Alberta, 2000.*
Landre, et al. "Fast Image Retrieval using Hierarchical Binary Signatures." International Symposium on Signal Processing and Its Applications. (2007): 1-4. Print.*
Liu et al., "A Similarity Measure Between Unordered Vector Sets with Application to Image Categorization," Conference on Computer Vision and Pattern Recognition, CVPR IEEE, Anchorage, AK, pp. 1-8, Jun. 2008.
Vasconcelos et al., "The Kullback-Leibler kernel as a framework for discriminant and localized representations for visual recognition," IEEE ECCV, Pt 3, 3023, pp. 43-441 (2004).
Jegou et al., "Hamming embedding and weak geometric consistency for large scale image search," European Conference on Computer Vision (2008).
Jebara et al., "Bhattacharyya and Expected Likelihood Kernels," COLT (2003).

* cited by examiner

COMPACT SIGNATURE FOR UNORDERED VECTOR SETS WITH APPLICATION TO IMAGE RETRIEVAL

BACKGROUND

The following relates to the information processing arts. The following is described with illustrative reference to image retrieval and categorization applications, but will be useful in numerous other applications entailing comparison, retrieval, categorization, or the like of objects such as images, video content, audio content, and so forth.

Some approaches for comparing objects are disclosed in Liu and Perronnin, U.S. Publ. Appl. No. 2009/0144033 A1 published Jun. 4, 2009, which is incorporated herein by reference in its entirety. In some embodiments disclosed in that reference, a universal mixture model including a plurality of universal mixture model components is adapted to a first object to generate a first object mixture model including a plurality of first object mixture model components having one to one correspondence with the plurality of universal mixture model components. A component-by-component comparison is performed of the plurality of first object mixture model components and a plurality of second object mixture model components obtained by adaptation of the universal mixture model to a second object and having one to one correspondence with the plurality of first object mixture model components. A similarity measure is generated for the first and second objects based on the component by component comparison.

The objects are represented by quantitative representations. For example, an image object can be represented by an unordered set of feature vectors where each feature vector has vector components which are selected quantitative measures of characteristics of an image key patch of the image. By distributing such image key patches across the image (for example on a grid, or randomly, or so forth) and computing a feature vector for each key patch, an unordered set of feature vectors is generated to represent the image. U.S. Publ. Appl. No. 2009/0144033 A1 considers by way of illustrative example image objects which are represented by such unordered sets of feature vectors representing key patches and the universal mixture model is a Gaussian mixture model with Gaussian mixture model components.

The object comparison approach of U.S. Publ. Appl. No. 2009/0144033 A1 has substantial advantages. The universal mixture model provides an a priori starting point for modeling the objects, which enhances speed of estimating the object mixture models. Moreover, since the mixture models for both objects to be compared are generated by adaptation of a same universal mixture model, it follows that there is a one-to-one correspondence of the object mixture model components, enabling component-by-component comparison which again is computationally efficient.

Accordingly, U.S. Publ. Appl. No. 2009/0144033 A1 discloses substantial advancement in the art of object comparison. Nonetheless, still further improvements that enhance computational speed, comparison accuracy, or both, would be desirable. For example, it would be advantageous to increase accuracy of the object comparison by utilizing more complex and probative object models. However, more complex models entail longer computational time and higher memory usage, especially for larger vector sets.

BRIEF DESCRIPTION

In some illustrative embodiments disclosed as illustrative examples herein, an apparatus comprises a processor programmed to compare a first object comprising or represented by a first set of vectors in a vector space and a second object comprising or represented by a second set of vectors in the vector space by a comparison method comprising: computing a first signature based on distribution of the vectors of the first set of vectors over a set of regions of the vector space wherein statistics of the vectors of the first set of vectors in the regions are represented in the first signature by values including binary values; computing a second signature based on distribution of the vectors of the second set of vectors over the set of regions of the vector space wherein statistics of the vectors of the second set of vectors in the regions are represented in the second signature by values including binary values; and computing a vector set comparison measure based on the first signature and the second signature.

In some illustrative embodiments disclosed as illustrative examples herein, a storage medium stores instructions executable by a digital processor to perform a method operative on a set of vectors in a vector space of dimensionality D, the method comprising: computing non-binary values $\alpha_i$, i=1, ..., N indicative of distribution of the vectors of the set of vectors amongst a set of N regions of the vector space; computing vectors of binary values $a_i$, i=1, ..., N indicative of statistics of the vectors of the set of vectors belonging to the ith region of the vector space; and defining a vector set signature for the set of vectors including the non-binary values $\alpha_i$, i=1, ..., N and the vectors of binary values $a_i$, i=1, ..., N.

In some illustrative embodiments disclosed as illustrative examples herein, a method is disclosed of computing a signature for an object comprising or represented by a set of vectors in a vector space of dimensionality D, the method comprising: computing statistics indicative of distribution of the vectors of the set of vectors amongst a set of regions $R_i$, i=1, ..., N of the vector space; binarizing at least some statistics associated with each region to generate sets of binary values $a_i$, i=1, ..., N indicative of statistics of the vectors of the set of vectors belonging to the respective regions $R_i$, i=1, ..., N; and defining a vector set signature for the set of vectors including the sets of binary values $a_i$, i=1, ..., N.

DETAILED DESCRIPTION

In the following, the terms "optimization", "minimization", and similar phraseology are to be broadly construed as one of ordinary skill in the art would understand these terms. For example, these terms are not to be construed as being limited to the absolute global optimum value, absolute global minimum, or so forth. For example, minimization of a function may employ an iterative minimization algorithm that terminates at a stopping criterion before an absolute minimum is reached. It is also contemplated for the optimum or minimum value to be a local optimum or local minimum value.

In the following, images are sometimes used as illustrative objects. More generally, an object may be any selected type of datum or data, such as an image, a video segment, an audio segment, a vector graphic, a text document, a multimedia document, or so forth. The objects are assumed to be represented by unordered sets of feature vectors of dimensionality D.

For example, an image may be represented by a set of vectors of dimensionality D as follows. A key patch selected in the image has D quantitative features derived therefrom which serve as the D elements or components of a feature vector representing the image key patch. This is repeated for a plurality of image key patches distributed across the image so as to generate an unordered set o feature vectors representing the image.

As another illustrative example, an audio segment can be divided into audio key patches distributed along the temporal length of the audio segment and each audio key patch characterized by a feature vector in order to generate a signature for the audio segment. As another illustrative example, a similar approach can be used for video segments, where the patches are video key patches distributed along the temporal length of the video segment. It is also contemplated for the object to comprise a vector set of vectors having dimensionality D. Here there is no need to derive the vector set from the object.

Comparison of the vector sets of objects comprising or represented by sets of vectors can be used for various purposes. For example, in a retrieval application, an input object is compared with objects of a database to identify and retrieve similar objects. In other applications, the comparison may be an intermediate operation, as in the case of some clustering algorithms where a pairwise similarity matrix is constructed for a set of objects, where an element (i,j) of the similarity matrix contains a similarity measure between ith and jth objects, and further processing of the similarity matrix enables partitioning out (that is, clustering) sub-groups of similar objects from the set of objects.

Figure 1:
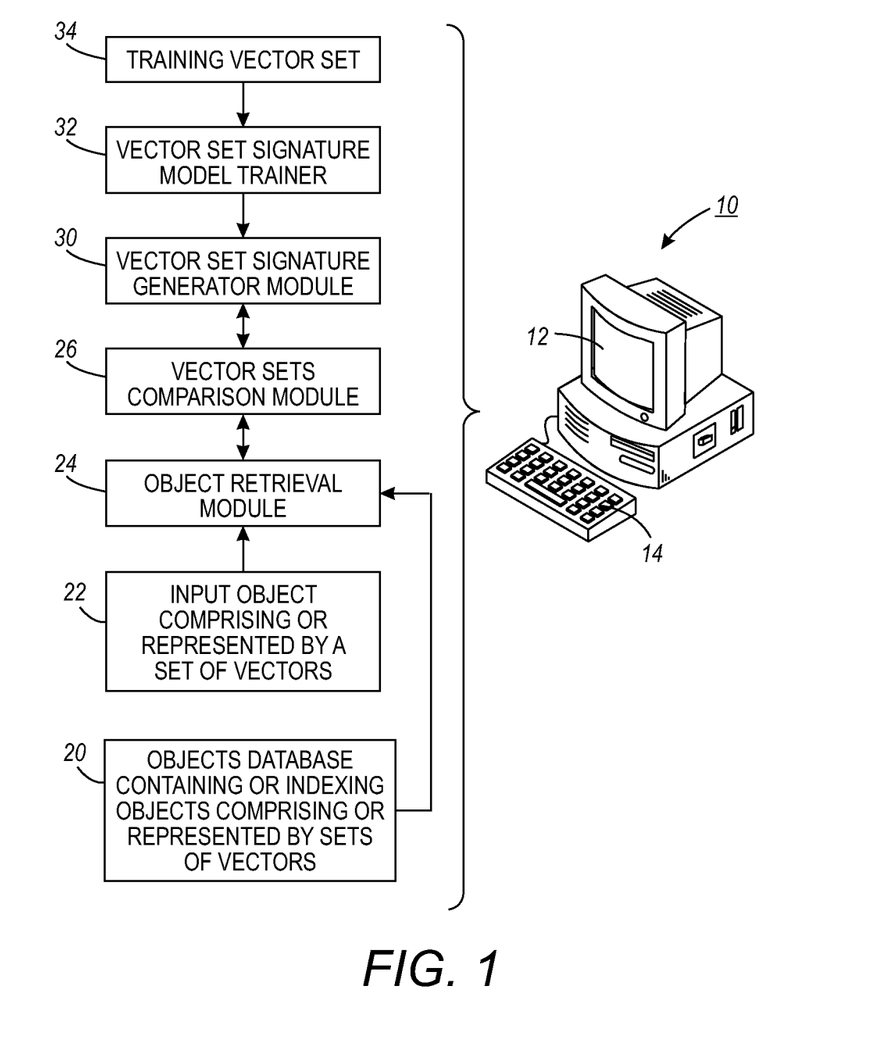
FIG. 1 diagrammatically shows an object retrieval system employing object comparison as disclosed herein.

FIG. 1 diagrammatically depicts an illustrative application, namely an object retrieval system implemented on an illustrated computer 10 or other digital processing device that includes a digital processor. The digital processor can be variously embodied, such as by a single-core processor, a dual-core processor (or more generally by a multiple-core processor, a digital processor and cooperating math coprocessor, a digital controller, graphical processing unit (GPU), combination thereof, or so forth. The illustrated computer 10 is a desktop or laptop computer including a display 12 and a keyboard 14. Other interfacing devices, such as a second monitor, a mouse or trackball, or so forth can also be included. The illustrated computer 10 can also be replaced by another digital processing device such as a network server having only network interfacing (for example, Internet or local area network (LAN) interfacing), or so forth.

The computer 10 or other digital processing device includes or has access to a storage medium (not shown) that stores instructions that are executable by the digital processor to perform the object retrieval operations and related process operations as disclosed herein. The storage medium may, for example, include one or more of the following: a hard disk drive or other magnetic storage medium; an optical disk or other optical storage medium; a random access memory (RAM), read-only memory (ROM), flash memory or other electronic memory medium; or so forth.

With continuing reference to FIG. 1, the object retrieval system retrieves objects from a database 20 that are similar to an input object 22. The database 20 contains or indexes objects comprising or represented by sets of vectors. The input object 22 also comprises or is represented by a set of vectors. The vectors have a common D. However, there is no limitation on the number of vectors in each set of vectors, and for example the input object 22 may comprise or be represented by a set of vectors numbering more or less than the number of vectors in a vector set corresponding to a database object.

An object retrieval module 24 receives the input object 22 and retrieves similar objects from the database 20. To do so, the object retrieval module 24 includes or has operative access to a vector sets comparison module 26 that compares the vector set corresponding to the input object 22 with a vector set corresponding to an object stored in or indexed by the database 20. Such comparisons are performed for some or all objects contained in or indexed by the database 20, and one or more database objects that are most similar to the input object 22 as measured by the vector sets comparison module 26 are retrieved. The retrieved objects may be displayed on the display 12 of the computer 10 (as may be appropriate, for example, if the retrieved objects are images), or may be played by an audio speaker (not shown) of the computer 10 (as may be appropriate, for example, if the retrieved objects are audio segments), or may be otherwise outputted in human-perceptible form. Alternatively, the retrieved objects may be otherwise utilized.

The compared vector sets may, in general, be relatively large. If the two vector sets have sizes $N_1$ and $N_2$, respectively, then a direct comparison entails $N_1 \times N_2$ comparisons, where each comparison involves D comparisons corresponding to the D dimensions of each vector. The number of computations involved in a single comparison of two vector sets is therefore of order $N_1 \times N_2 \times D$, which can be impractical for vector sets of high dimensionality and/or which contain a large number of vectors per vector set.

Accordingly, the vector sets comparison module 26 includes or has operative access to a vector set signature generator module 30 that generates a compact signature for each vector set. The vector sets comparison module 26 then compares these signatures, rather than comparing the vector sets directly. By suitable selection of the signatures, the comparison can be made tractable. In some embodiments, the vector set signature generator module 30 makes use of a model that is generated by a vector set signature model trainer 32. The model may be a parameterized model whose parameters are optimized by training respective to a training vector set 34.

The object retrieval system of FIG. 1 is an illustrative application of the vector set signature generator 30 and the vector sets comparison module 26. It is to be appreciated that the components 26, 30 will find other applications where the generation of a compact signature for a vector set is useful, or where comparison of vector sets is useful. Such applications may include, for example, clustering in which elements of a pairwise similarity matrix are computed using the components 26, 30, or so forth.

Having provided an overview of an illustrative object retrieval system with reference to FIG. 1, some suitable embodiments of the components 26, 30, 32 are next described in additional detail.

In the following, an unordered set X of vectors of dimensionality D is to be compared with another unordered set Y of vectors also of dimensionality D, where D is a positive integer greater than one. The vectors of the sets X and Y reside in a D-dimensional vector space. In the illustrative application of FIG. 1, for example, the vector set X may correspond to the input object 22 and the vector set Y may correspond to a database object to be compared with the input object 22.

Toward this end, a suitable signature for each of the vector sets X and Y suitably generated by the vector set signature generator module 30 are described. The unordered vector sets X and Y are each modeled using a model in which the D-dimensional vector space is partitioned into N regions, where N is a positive integer greater than one. The N regions are denoted herein as $\{R_i, i=1, \ldots, N\}$. The unordered vector set X is represented in this model using a signature of the form $\{(\alpha_i, a_i), i=1, \ldots, N\}$ where $\alpha_i$ denotes the fraction of vectors of the unordered vector set X lying in region $R_i$, and $a_i$ is a binary vector that represents the distribution of the vectors of the unordered vector set X which lie in the region $R_i$. In analogous fashion, the unordered vector set Y is represented using a signature of the form $\{(\beta_i, b_i), i=1, \ldots, N\}$ where $\beta_i$ denotes the fraction of vectors of the unordered vector set Y lying in region $R_i$, and $b_i$ is a binary vector that represents the distribution of the vectors of the unordered vector set Y which lie in the region $R_i$.

The N regions can be either hard or soft regions. In the case of hard regions, each region $R_i$ has an abrupt boundary and a given vector is either within the region $R_i$ or not. In this case $\alpha_i = |X_i|/|X|$ where $|X|$ is the number of vectors in the unordered vector set X and $|X_i|$ is the number of vectors of the unordered vector set X which lie in the region $R_i$. In analogous fashion, $\beta_i = |Y_i|/|Y|$ where $|Y|$ is the number of vectors in the unordered vector set Y and $|Y_i|$ is the number of vectors of the unordered vector set Y which lie in the region $R_i$.

In the case of soft regions, a membership function is associated to each region $R_i$ and a given vector x may have a "fractional" membership in a region $R_i$. For example, if the set of regions is associated with a Gaussian mixture model, as done in U.S. Publ. Appl. No. 2009/0144033 A1 which is incorporated herein by reference in its entirety, then softmax functions can be used as membership functions. In the illustrative example of a Gaussian mixture model with N Gaussian components, each Gaussian (i.e. region) is characterized by a Gaussian distribution p, and is associated to a mixture weight $\omega_i$. The softmax membership function of vector x to region i has the form:

$$\gamma_i(x) = \frac{\omega_i p_i(x)}{\sum_{j=1}^{N} \omega_j p_j(x)}.$$

The binary vectors $a_i$ and $b_i$ represent the distribution of those vectors of the respective unordered vector sets X and Y which lie in the region $R_i$. In one illustrative example, the representation assumes Gaussian distributions for the vectors lying in the region $R_i$ and the whole vector set is modeled by a Gaussian mixture model. Each Gaussian (i.e. each region) is described by a mean vector $\mu_i$ and a covariance matrix $\Sigma_i$. In one embodiment, covariance matrices are assumed diagonal, that is the covariance matrix $\Sigma_i$ can be replaced by a variance vector $\sigma_i^2$ (or, equivalently, a standard deviation vector $\sigma_i$). In this case, the binary vectors of statistics $a_i$ and $b_i$ each have dimensionality 2D and can, for example, be written as $a_i = [\mu_1^{[b]} \sigma_1^{[b]} \mu_2^{[b]} \sigma_2^{[b]} \ldots \mu_D^{[b]} \sigma_D^{[b]}]^T$ where the superscript T is a transposition operation and the superscript [b] denotes a binarized representation, that is for example $\mu_1^{[b]}$ is a binarized representation of the real-valued mean $\mu_1$.

In another illustrative example, the statistical representation makes no assumption about the distribution, and represents the statistics of the vectors belonging to the region $R_i$ by binarized representations of the mean values $\mu$ and binarized representations of one higher order moment, such as a second order moment, again leading to binary vectors of statistics and b, each having dimensionality 2D.

As yet another illustrative example, the representation of the distribution of vectors is by binarized representations of the mean values $\mu$ alone, leading to binary vectors of statistics $a_i$ and $b_i$ each have dimensionality D, for example $a_i = [\mu_1^{[b]} \mu_2^{[b]} \ldots \mu_D^{[b]}]^T$ where again the superscript [b] denotes a binarized representation.

In order to perform the binarization, the chosen real-valued statistical values (e.g., mean, variance, standard deviation, expectation, or so forth) are suitably thresholded. To generalize, the binary vector $a_i$ consists of ordered elements $a_{i,d}$, $d=1, \ldots, MD$ where M denotes the number of statistical measures used in representing the statistics of each dimension of the vector space of dimensionality D. It is to be understood that the elements $a_{i,d}$ are binary values. Thus, for example, if the statistics of each dimension are represented by binarized values of the mean value alone, then $M=1$; whereas, if the statistics of each dimension are represented by binarized values of the mean value and the variance value then $M=2$; or so forth. In analogous fashion the binary vector $b_i$ consists of ordered elements $b_{i,d}$, $d=1, \ldots, MD$, where again it is to be understood that the elements $b_{i,d}$ are binary values. The thresholding is preferably selected to provide maximally informative binary values. Toward this end, a different threshold $\theta_{i,d}$, $d=1, \ldots, M \cdot D$ is selected for each dimension of the space of dimensionality MD. Representing the vector of statistics (prior to binarization) generically as $v_d$, $d=1, \ldots, M \cdot D$ where it is to be understood that the elements are real values, the binary value (e.g., $a_{i,d}$ or $b_{i,d}$) is one (1) if $v_{i,d} > \theta_{i,d}$ and zero (0) otherwise. Other binarization schemes can be used, such as: the binary value is one (1) if $v_{i,d} \geq \theta_{i,d}$ and zero (0) otherwise; or, the binary value is zero (0) if $v_{i,d} > \theta_{i,d}$ and one (1) otherwise. For illustrative purpose, binarization in which the binary value is one (1) if $v_{i,d} > \theta_{i,d}$ and zero (0) otherwise is used herein.

The thresholds $\theta_{i,d}$, $d=1, \ldots, M \cdot D$ can advantageously be selected to be maximally informative. For example, the thresholds can be based on the expected value of the statistics, or on the median value as estimated on a training set, or so forth. Using the median value advantageously ensures that a bit is maximally informative as the probability of its value being 0 is 0.5 and the probability of its value being 1 is also 0.5. Accordingly, in the illustrative examples set forth herein the median values are used as the thresholds.

Thus, the vector set signature generator module 30 outputs the signature $\{(\alpha_i, a_i), i=1, \ldots, N\}$ for the unordered vector set X, and outputs the signature $\{(\beta_i, b_i), i=1, \ldots, N\}$ for the unordered vector set Y. The vector sets comparison module 26 then computes a similarity $S(X,Y)$ of the two unordered vector sets X and Y, for example using the metric:

$$S(X, Y) = \sum_{i=1}^{N} \sqrt{\alpha_i \beta_i} \cdot g(a_i, b_i), \quad (1)$$

where the operation $g(a_i, b_i)$ is a measure of the similarity of the binary vectors $a_i$ and $b_i$.

There is some correspondence of this similarity measure with ones disclosed in U.S. Publ. Appl. No. 2009/0144033 A1. If the regions $\{R_i, i=1, \ldots, N\}$ are soft regions defined by Gaussian membership functions, then the correspondence is even more apparent. For example, U.S. Publ. Appl. No. 2009/0144033 A1 discloses similarity measures when using Gaussian mixture models (GMMs) which are of the form:

$$S(X, Y) = \sum_{i=1}^{N} \alpha_i \beta_i \cdot K_{ppk}^{\rho}(p_i, q_i), \quad (2)$$

where in Equation (2) p, and q, are the ith adapted GMM Gaussian components of the signatures of the two compared vector sets, respectively, $\alpha_i$ and $\beta_i$ are the weights for the adapted GMM Gaussian components, and $K_{ppk}^{\rho}$ is a probability product kernel (PPK). For $\rho=0.5$ the PPK kernel becomes the Bhattacharya kernel denoted herein as Bha($p_i$, $q_i$) (see U.S. Publ. Appl. No. 2009/0144033 A1), and Equation (2) can be written as:

$$S(X, Y) = \sum_{i=1}^{N} \sqrt{\alpha_i \beta_i} \cdot Bha(p_i, q_i), \quad (3)$$

The correspondence between the term $\sqrt{\alpha_i \beta_i}$ of Equation (1) comparing the region assignments or memberships of the two vector sets has manifest correspondence with the term $\alpha_i \beta_i$, (Equation (2)) or $\sqrt{\alpha_i \beta_i}$ (Equation (3)) indicating weights for the GMM Gaussian components of the adapted vector set models. Correspondence is also manifest between the similarity measure g($a_i$, $b_i$) of binary vectors $a_i$ and $b_i$ in Equation (1) and the Gaussian component overlap measure $K_{ppk}^{\rho}$ ($p_i$, $q_i$) in Equation (2) or Bha($p_i$, $q_i$) in Equation (3). However, computation of the PPK or Bhattacharya kernel is computationally relatively complex, and moreover the universal GMM must be adapted to each of the two respective vector sets to generate the adapted GMM models before Equation (2) or Equation (3) can be applied. The adaptation typically employs a Maximum a Posteriori (MAP) objective function which incorporates the universal GMM. The a priori information incorporated by MAP decreases the model discriminativeness.

In contrast, the similarity measure g($a_i$, $b_i$) of binary vectors $a_i$ and $b_i$ is computationally straightforward as it involves manipulation of binary values. For example, in some embodiments disclosed herein, a Hamming similarity is used as the similarity measure g($a_i$, $b_i$). A suitable computational implementation of the Hamming similarity is as follows. First, a bitwise exclusive OR operation (XOR) is performed between the binary vectors $a_i$ and $b_i$ to generate a vector of bits of the same length (namely, length MD) which contains a bit of value "1" for each position where the input vectors have different binary values and a bit of value "0" for each position where the input vectors have the same binary values. Second, a bitwise NOT operation is performed to invert the vector, that is, to replace each 1 with a 0 and each 0 with a 1, so as to yield a vector of length MD containing a bit 1 for each position where the input vectors $a_i$ and $b_i$ have bit values that are equal. Finally, the Hamming weight (also referred to as population count in case of a binary vector) is computed by counting the number of bits that are set to 1. Algorithms for efficient population count are known, such as the "popcount_3" algorithm. Other variant computational approaches can be used, such as an XOR followed by counting the "0" positions (thus omitting the NOT operation), or using a logical equality operator followed by counting the "1" positions (thus again omitting the NOT operation), or so forth.

Moreover, the computation of the vectors $a_i$ and $b_i$ is computationally straightforward as compared with MAP adaptation of Gaussian components of the universal GMM to generate the adapted GMM components $p_i$ and $q_i$. For example, in embodiments in which it is assumed that the distribution of the features of a vector set in a given region is Gaussian and the statistics are the Gaussian mean and the Gaussian variance, these can be computed using MAP analogous to the process disclosed U.S. Publ. Appl. No. 2009/0144033 A1. However, it is disclosed herein that maximum likelihood (ML) estimates lead to the comparable or better results for the vectors $a_i$ and $b_i$ than those achieved using MAP. Advantageously, the ML estimation does not utilize a priori information.

The skilled artisan will note that the signatures {($\alpha_i$, $a_i$), i=1, ..., N} and {($\beta_i$, $b_i$), i=1, ..., N} contain relatively less information than corresponding adapted GMM signatures used in U.S. Publ. Appl. No. 2009/0144033 A1. Information is lost through binarization of the statistics of the vectors $a_i$ and $b_i$. The skilled artisan might therefore conclude that the vector set comparison approaches disclosed herein are not practically feasible because the lost information will result in less accurate vector set comparisons and consequent degradation of object retrieval accuracy (in the case of a retrieval application). However, it is shown herein that the accuracy of the disclosed comparison methods is actually comparable with, or even better than, the comparison methods disclosed in U.S. Publ. Appl. No. 2009/0144033 A1 when using the same number of regions or Gaussian components. Moreover, this comparable or improved comparison accuracy is achieved with substantial concomitant improvement of speed measureable in orders of magnitude. Optionally, this speed improvement can be traded off for still further accuracy enhancement by employing a larger number of regions and hence more statistics.

An illustrative embodiment of the vector signature and comparison components 26, 30, 32 is further described with reference to FIG. 2 (which depicts the illustrative embodiment of the model trainer 32) and FIG. 3 (which depicts the illustrative embodiment of the signature generator module 30). In principle, the N regions can be selected arbitrarily to span the vector space of dimensionality D. Practically, however, the N regions are preferably selected to be probative of the vector sets to be compared. Toward this end, the model trainer 32 selects the N regions {$R_i$, i=1, ..., N} 40, and the thresholds $\theta_{i,d}$ 42, to be probative for the training vector set 34 which includes a sufficient breadth of vectors of dimensionality D to be representative of the vector sets likely to be encountered by the comparison module 26. For example, in one suitable approach, the training vector set 34 may be constructed as an aggregation of vectors of a representative sampling of database object vector sets.

Figure 2:
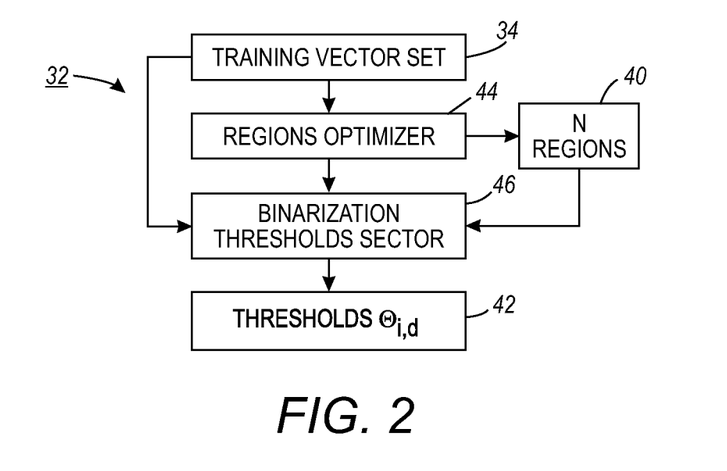
FIG. 2 diagrammatically shows a suitable embodiment of the vector set signature model trainer of FIG. 1.
Figure 3:
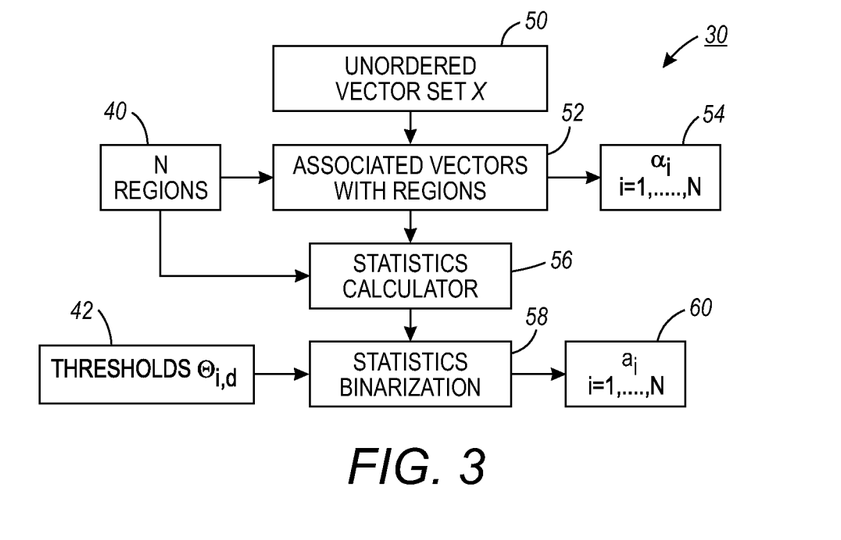
FIG. 3 diagrammatically shows a suitable embodiment of the vector set signature generator module of FIG. 1.

In the illustrative embodiment of FIGS. 2 and 3, the vector set signature model employs soft regions defined by Gaussian membership functions selected to define a Gaussian mixture model (GMM) that is trained on the training set 34. Let $\chi = \{x_t, t=1, ..., T\}$ represent the training vector set 34. The GMM includes N Gaussian components $p_i$, i=1, ..., N corresponding to the N regions. The parameters of the N Gaussian components are denoted $\lambda = \{\omega_i, \mu_i, \sigma_i^2, i=1, ..., N\}$ where $\omega_i$, $\mu_i$, $\sigma_i^2$ are respectively the weight, mean vector, and variance vector of the ith Gaussian component. In this illustrative example, the GMM is trained by a regions optimizer 44 using a maximum likelihood (ML) estimation employing the expectation-maximization (EM) algorithm, which iteratively alternates the computation of the following posterior probabilities (that is, the E-step):

$$\gamma_i(x_t) = \frac{\omega_i p_i(x_t)}{\sum_{j=1}^{N} \omega_j p_j(x_t)} \quad (4)$$

and the re-estimation of the parameters (M-step):

$$\hat{\omega}_i = \frac{1}{T}\sum_{t=1}^{T}\gamma_i(x_t) \quad (5)$$

$$\hat{\mu}_i = \frac{\sum_{t=1}^{T}\gamma_i(x_t)x_t}{\sum_{t=1}^{T}\gamma_i(x_t)}, \quad (6)$$

and $$\hat{\sigma}_i^2 = \frac{\sum_{t=1}^{T}\gamma_i(x_t)x_t^2}{\sum_{t=1}^{T}\gamma_i(x_t)} - \hat{\mu}_i^2. \quad (7)$$

Once the regions are optimized by selecting the Gaussian membership functions, a binarization thresholds selector 46 selects the thresholds $\theta_{id}$ 42. Using the median value advantageously ensures that a bit is maximally informative as the probability of its value being 0 is 0.5 and the probability of its value being 1 is also 0.5 (at least for the vectors of the training vectors set 34). Accordingly, in the illustrative examples set forth herein the median values of the final iteratively determined mean values $\mu_i$ and variance values $\sigma_i^2$ are used as the thresholds. Note that although in FIG. 2 the same training vector set 34 was used in both the regions optimizer operation 44 and the binarization thresholds selector 46, it is also contemplated to use different training vector sets for these two operations.

With reference to FIG. 3, operation of the illustrative embodiment of the vector set signature generator module 30 as trained by the trainer 32 depicted in FIG. 2 is described. In FIG. 3 the input vector set is the vector set X 50. A processing block 52 associates the vectors of the vector set X 50 with the various regions $R_i$ defined by the training of FIG. 2, and $$\alpha_i = \frac{1}{|X|}\sum_{x \in X}\gamma_i(x)$$

54 is computed where $\gamma_i$ is the softmax membership function for region $R_i$ (compare with Equation 4) which is computed from the parameters estimated by the regions optimizer 44 of FIG. 2.

A statistics calculator 56 then computes the statistics of the vectors assigned to each region $R_i$. Because soft regions are employed in this illustrative example, the contribution of each vector to the statistical value of region $R_i$ is suitably weighted by its membership in the region $R_i$. For example, the mean value $\mu_{id}$ for the dth dimension of vectors belonging to region $R_i$ may be suitably computed as $$\mu_{id} = \frac{\sum_{x \in X}\gamma_i(x)\cdot x_d}{\sum_{x \in X}\gamma_i(x)}$$

where $x_d$ is the value of the dth dimension of the vector x and the term $\gamma_i(x)$ provides the membership weighting. As a comparison, for a hard region $R_i$ the mean value $\mu_{id}$ for the dth dimension of vectors belonging to the hard region $R_i$ can be suitably written as $$\mu_{id} = \frac{1}{|x \in R_i|}\sum_{x \in R_i}x_d$$

where $|x \in R_i|$ is a count of the vectors belonging to the hard region $R_i$.

With continuing reference to FIG. 3, a statistics binarization element 58 binarizes the statistics computed by the statistics calculator 56 using the thresholds $\theta_{id}$ 42 generated by the training of FIG. 2. This yields the final binary vectors $a_i$, i=1, ..., N 60.

With returning reference to FIG. 1, the signatures for the vector sets X and Y determined by the signature generator module 30 of FIG. 3 employing the signature model trained by the trainer 32 of FIG. 2. (In the case of FIG. 3, the processing for the vector set Y is analogous to generate the signature parameters $\beta_i$ and $b_i$). The comparison module 26 then generates the comparison measure S(X,Y) using Equation (1), or more generally using a similarity measure of the form $$S(X, Y) = \sum_{i=1}^{N} f(\alpha_i, \beta_i)\cdot g(a_i, b_i)$$

where the function $f$ is chosen to make a sensible comparison of the parameters $\alpha_i$ and $\beta_i$.

The disclosed retrieval system was implemented and applied on the Holiday dataset (see Jégou et al., "A contextual dissimilarity measure for accurate and efficient image search", IEEE CVPR, 2007). This dataset consists of 1,491 images of 500 scenes or landmarks. In the experiments, the first image of each scene was used for querying. The retrieval accuracy was measured in terms of Average Precision (AP). Low-level features (approximately 550 per image) were extracted on grids at multiple scales. The low-level features are 128-dimensional histograms of gradient orientations. Their dimensionality is reduced down to a value D using Principal Component Analysis (PCA). Values of the dimensionality D between 20 to 70 were tested, and little variation in the retrieval accuracy was observed in the range 30 to 60—accordingly, D=32 was used for the reported experimental tests. This dimensionality is advantageous in that it ensures that the binary vector characterizing a given region fits in 64 bits (32 bits for the binarized mean and 32 bits for the binarized variance).

The approach with binarized signatures as disclosed herein was compared with two baseline systems: (i) a bag-of-visual-words approach utilizing discrete distributions; and (ii) the approach of U.S. Publ. Appl. No. 2009/0144033 A1. For the latter baseline, $\tau$=10 was used as this value provided optimal performance for that baseline approach. For all three approaches, the PCA space and the signature model (e.g., the regions optimizer 44 of FIG. 2) were trained on a separate set of 1,000 images coming from a photofinishing workflow. The same set of images was used to compute the median values for the binarization step performed by the binarization thresholds selector 46. For all three similarity measures, C/C++ implementations were used for a fair comparison of the computational cost.

Figure 4:
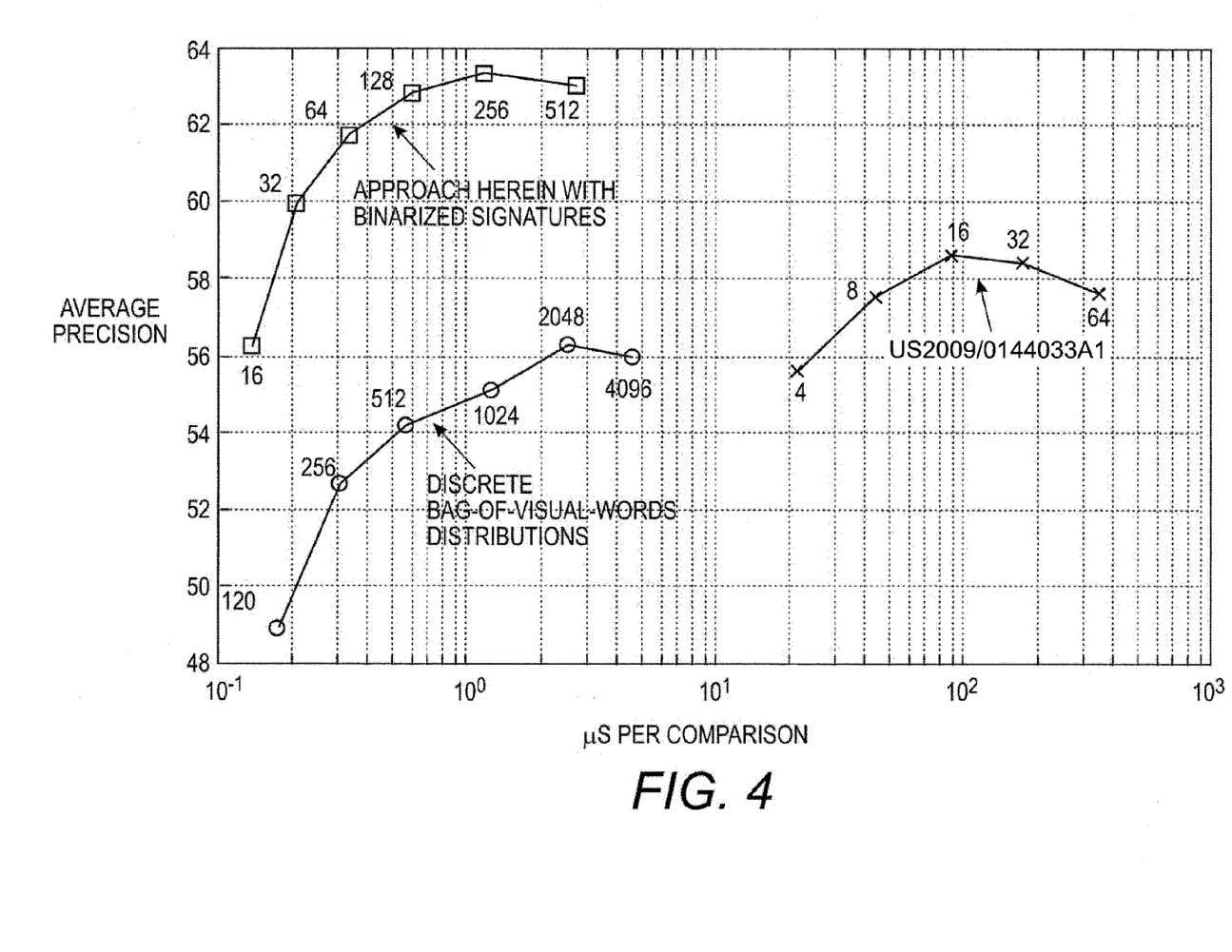
FIGS. 4 and 5 graphically present some experimental results.

FIG. 4 shows some experimental results. The number of Gaussians (i.e., the number of regions N for the approach with binarized signatures as disclosed herein) were varied, and the value of N employed is shown next to each data point in FIG. 4. The abscissa of FIG. 4 is the computational cost per vector sets comparison, while the ordinate is the average precision (AP). For the bag-of-visual words approach, the best result obtained was for 2,048 Gaussian, for which AP=56.3% and computation time was 2.57 µs per comparison. For the method of U.S. Publ. Appl. No. 2009/0144033 A1, 16 Gaussians were optimal, yielding AP=58.6% and 88.5 µs per comparison. For the approach with binarized signatures as disclosed herein, N=256 soft regions represented by Gaussian membership functions was optimal, yielding AP=63.3% and 1.16 µs per comparison.

Compared to the bag-of-visual words approach, the similarity computation of the approach with binarized signatures as disclosed herein is more than twice as fast and the performance improvement is substantial (+7.0% absolute AP). Compared to the method of U.S. Publ. Appl. No. 2009/0144033 A1 the similarity computation disclosed herein is more than 75 times faster and the performance is again increased substantially (+4.7% absolute). This latter result is surprising since the skilled artisan would likely expect a similarity based on binarized vectors to perform worse due to loss of information during the binarization process.

Figure 5:
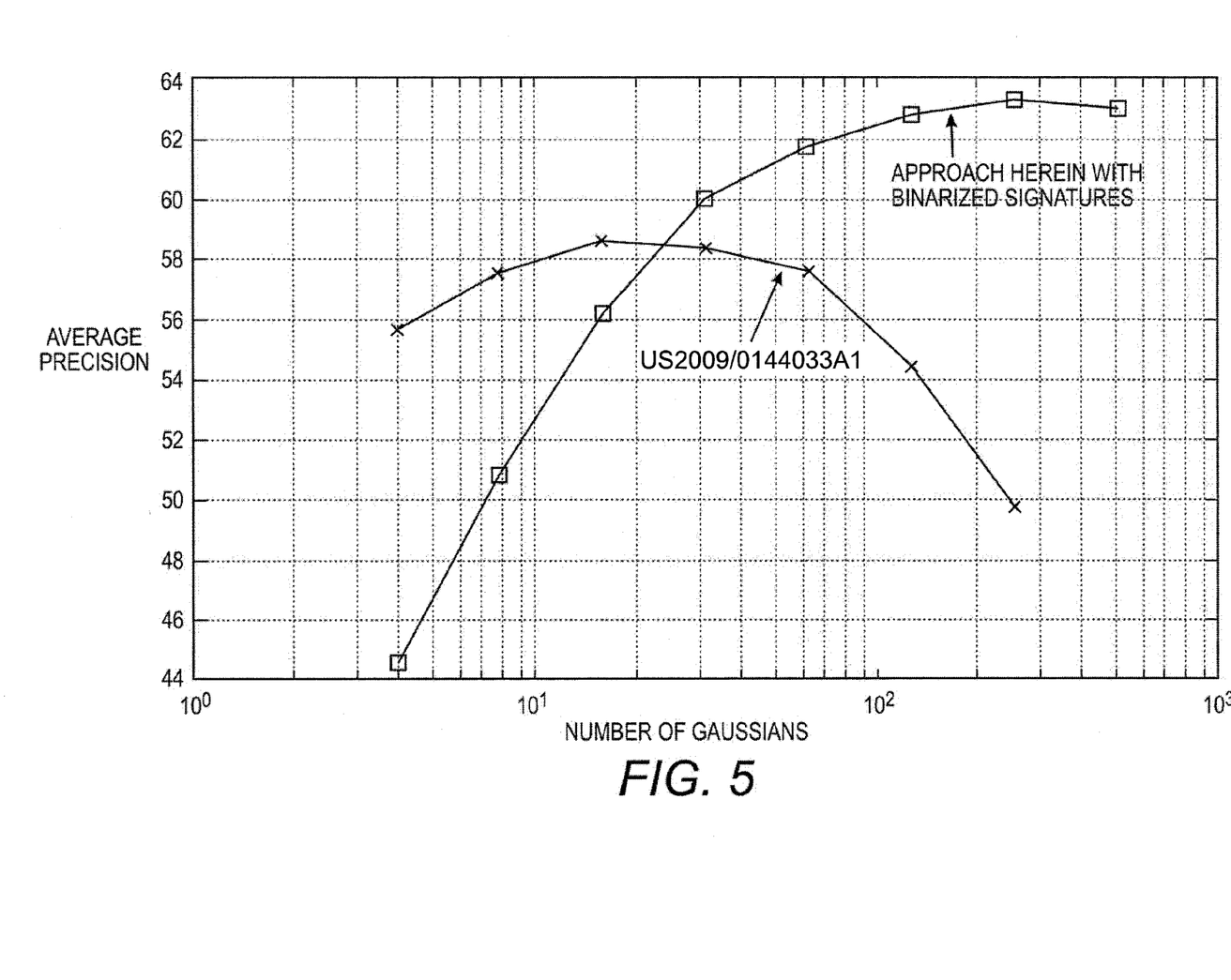

FIG. 5 plots AP versus number of Gaussians or regions N for the approach with binarized signatures as disclosed herein compared with the approach of U.S. Publ. Appl. No. 2009/0144033 A1. It is seen that for a small number of Gaussians (4, 8 and 16), the method of U.S. Publ. Appl. No. 2009/0144033 A1 outperforms the approach disclosed herein. However, for a larger number of Gaussians (64 and more), the approach disclosed herein outperforms that of U.S. Publ. Appl. No. 2009/0144033 A1.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An apparatus comprising:
a processor programmed to compare a first object comprising or represented by a first set of vectors in a vector space and a second object comprising or represented by a second set of vectors in the vector space by a comparison method comprising:
computing a first signature based on distribution of the vectors of the first set of vectors over a set of regions of the vector space wherein statistics of the vectors of the first set of vectors in the regions are represented in the first signature by values including a binary vector for each region representing statistics of the distribution in the vector space of the vectors of the first set of vectors which lie in the region,
computing a second signature based on distribution of the vectors of the second set of vectors over the set of regions of the vector space wherein statistics of the vectors of the second set of vectors in the regions are represented in the second signature by values including a binary vector for each region representing statistics of the distribution in the vector space of the vectors of the second set of vectors which lie in the region, and
computing a vector set comparison measure based on the first signature and the second signature.

2. The apparatus as set forth in claim 1, wherein the regions of the set of regions are hard regions.

3. The apparatus as set forth in claim 1, wherein the regions of the set of regions are soft regions defined by membership functions such that a given vector of the set of vectors may have a fractional membership in a region of the vector space.

4. The apparatus as set forth in claim 1, wherein:
the first signature further includes non-binary values indicative of the distribution of the vectors of the first set of vectors over the set of regions, and
the second signature further includes non-binary values indicative of the distribution of the vectors of the second set of vectors over the set of regions.

5. The apparatus as set forth in claim 1, wherein:
the first signature includes a binary vector of length M·D where D is the dimensionality of the vector space and M different statistical measures are included in the binary vector to represent the statistics of the distribution in the vector space of each dimension of the vectors of the first set of vectors in the regions, and
the second signature includes a binary vector of length M·D.

6. The apparatus as set forth in claim 1, wherein computing a vector set comparison measure based on the first signature and the second signature comprises:
computing a vector set comparison measure based on a bitwise comparison binary vectors of the first and second signatures.

7. The apparatus as set forth in claim 6, wherein the bitwise comparison binary vectors of the first and second signatures is computed using a Hamming similarity.

8. The apparatus as set forth in claim 1, further comprising:
a database of objects comprising or represented by sets of vectors in the vector space; and
an object retrieval module configured to retrieve objects from the database that are similar to an input object comprising or represented by a set of vectors in the vector space as measured by said comparison method.

9. The apparatus as set forth in claim 1, wherein the first and second objects are selected from a group consisting of: (i) images, (ii) audio segments, and (iii) said first set of vectors in the vector space and said second set of vectors in the vector space.

10. A non-transitory storage medium storing instructions executable by a digital processor to perform a method operative on a set of vectors in a vector space of dimensionality D, the method comprising:
computing non-binary values $\alpha_i$, i=1, . . . , N indicative of distribution of the vectors of the set of vectors amongst a set of N regions of the vector space;
computing vectors of binary values $a_i$, i=1, . . . , N indicative of statistics of the distribution in the vector space of the vectors of the set of vectors belonging to the ith region of the vector space; and defining a vector set signature for the set of vectors including the non-binary values $\alpha_i$, i=1, ..., N and the vectors of binary values $a_i$, i=1, ..., N.

11. The non-transitory storage medium as set forth in claim 10, wherein the method further comprises determining the N regions of the vector space by training respective to a training set of vectors in the vector space of dimensionality D.

12. The non-transitory storage medium as set forth in claim 10, wherein each vector of binary values $a_i$ includes D binary values corresponding to binarized mean values of the vectors of the set of vectors belonging to the ith region of the vector space.

13. The non-transitory storage medium as set forth in claim 12, wherein each vector of binary values $a_i$ further includes D binary values corresponding to binarized variance or standard deviation values of the vectors of the set of vectors belonging to the ith region of the vector space.

14. The non-transitory storage medium as set forth in claim 10, wherein the computing vectors of binary values $a_i$, i=1, ..., N indicative of statistics of the distribution in the vector space of the vectors of the set of vectors belonging to the ith region of the vector space comprises:
  binarizing real-valued statistical values corresponding to the components $a_{id}$ of the vector of binary values $a_i$ using respective thresholds $\theta_{id}$.

15. The non-transitory storage medium as set forth in claim 10, wherein the N regions of the vector space are soft regions defined by membership functions such that a given vector of the set of vectors may have a fractional membership in a region.

16. The non-transitory storage medium as set forth in claim 10, wherein the performed method further comprises:
  repeating the computing non-binary values, the computing vectors of binary values, and the defining a vector set signature for two sets of vectors to generate a corresponding two vector set signatures; and
  computing a quantitative comparison of the two sets of vectors using the corresponding two vector set signatures.

17. The non-transitory storage medium as set forth in claim 16, wherein the computing a quantitative comparison of the two sets of vectors using the corresponding two vector set signatures comprises:
  computing Hamming similarities between corresponding vectors of binary values of the two vector set signatures.

18. A non-transitory storage medium instructions executable by a digital processor to perform a method operative on a set of vectors in a vector space of dimensionality D, the method comprising:
  computing non-binary values $\alpha_i$, i=1, ..., N indicative of distribution of the vectors of the set of vectors amongst a set of N regions of the vector space;
  computing vectors of binary values $a_i$, i=1, ..., N indicative of statistics of the vectors of the set of vectors belonging to the ith region of the vector space;
  defining a vector set signature for the set of vectors including the non-binary values $\alpha_i$, i=1, ..., N and the vectors of binary values $a_i$, i=1, ..., N;
  repeating the computing non-binary values, the computing vectors of binary values, and the defining a vector set signature for two sets of vectors X and Y to generate a corresponding two vector set signatures; and
  computing a quantitative comparison $S(X, Y)$ of the two sets of vectors X and Y using the corresponding two vector set signatures as $$S(X, Y) = \sum_{i=1}^{N} f(\alpha_i, \beta_i) \cdot g(a_i, b_i)$$

where $\alpha_i$, $\beta_i$ are the non-binary values of the two vector set signatures, $a_i$, $b_i$ are the vectors of binary values of the two vector set signatures, $f$ is a comparison function, and $g$ is a bitwise comparison function.

19. The non-transitory storage medium as set forth in claim 18, wherein g is a Hamming similarity.

20. The apparatus as set forth in claim 3, wherein the soft regions are defined by membership functions of the form $$\gamma_i(x) = \frac{\omega_i p_i(x)}{\sum_{j=1}^{N} \omega_j p_j(x)}$$

where i denotes the i-th soft region, x denotes a vector of the first or second set of vectors, $p_i$ denotes the i-th Gaussian distribution of a Gaussian Mixture Model, and $\omega_i$ denotes the mixture weight of the i-th Gaussian distribution in the Gaussian Mixture Model.

21. The non-transitory storage medium as set forth in claim 15, wherein the soft regions are defined by membership functions of the form $$\gamma_i(x) = \frac{\omega_i p_i(x)}{\sum_{j=1}^{N} \omega_j p_j(x)}$$

where i denotes the i-th soft region, x denotes a vector of the first or second set of vectors, $p_i$ denotes the i-th Gaussian distribution of a Gaussian Mixture Model, and $\omega_i$ denotes the mixture weight of the i-th Gaussian distribution in the Gaussian Mixture Model.

* * * * *